April 3, 1956     I. W. SIMPKINS     2,740,497
BRAKE WITH GROOVED LINING

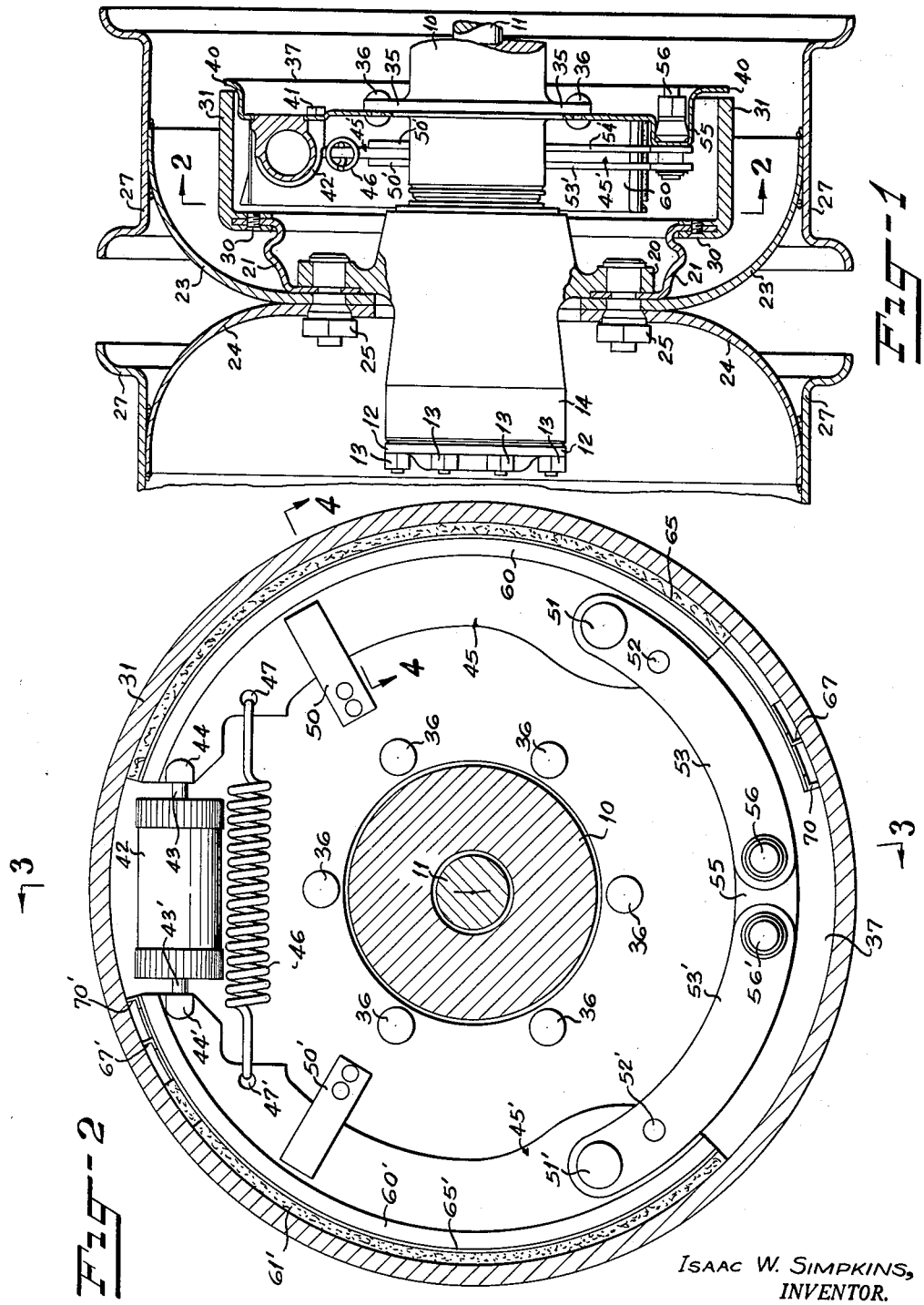

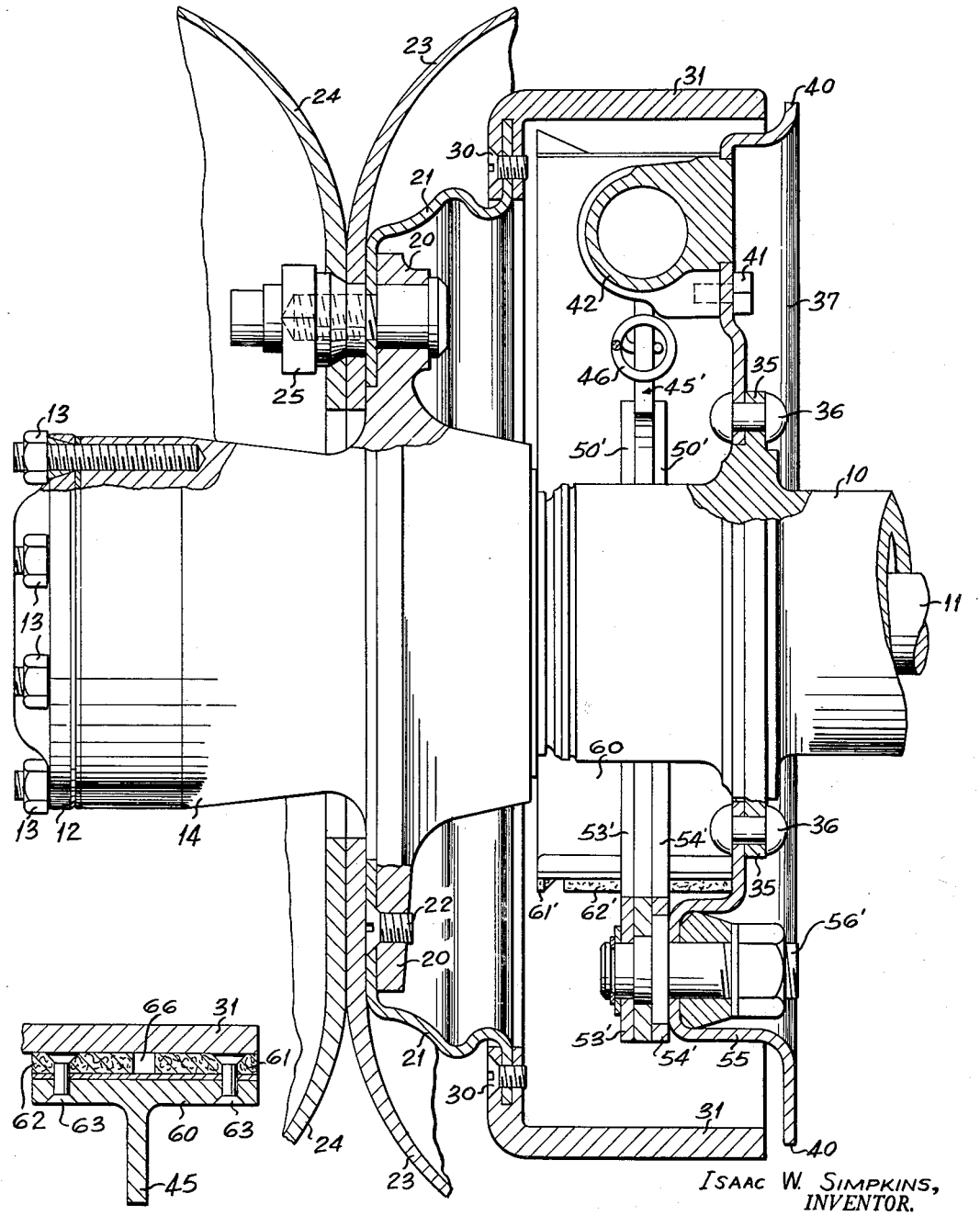

Filed May 28, 1949     3 Sheets-Sheet 3

ISAAC W. SIMPKINS,
INVENTOR.

BY

ATTORNEY

2,740,497

BRAKE WITH GROOVED LINING

Isaac W. Simpkins, Charlotte, N. C.; Nan B. Simpkins, executrix of said Isaac W. Simpkins, deceased Application May 28, 1949, Serial No. 96,039

6 Claims. (Cl. 188—78)

This invention relates to brake mechanisms and more especially to an improved brake lining structure for automotive vehicles adapted to be secured to the surfaces of brake shoes adjacent the brake drum and which is designed so as to tend to throw particles of earth such as clay, mud, gravel and the like away from the brake drum in the event that the motor vehicle on which the brake shoes are mounted may have been driven over muddy roads.

Automotive vehicles, particularly trucks and busses, must, of necessity, travel through rural districts, many of which do not have paved streets or highways. Heretofore, considerable amounts of mud, clay, and the like have collected on the brake drums as well as the brake shoes of trucks and particularly of school busses as they travel over unpaved or muddy roads and streets and this has proved hazardous in that the pieces of earth collecting on the brake shoes and the brake drums have drastically decreased the efficiency of the braking action effected between the brake shoes and the brake drums upon the brakes being applied in the usual manner by the operator of the bus or truck and, in some cases, the brakes of the motor vehicle have been rendered entirely ineffective.

Also, due to the fact that the particles of earth would collect on the outer surfaces of the brake linings, the particles of earth would create an abrasive action between the brake lining material and the brake drums, as a result of which the brake drums on the motor vehicle would become scored or worn to such an extent as to weaken the walls of the brake drums and thus the brake drums would have to be replaced after they had been in use for less than half of their normal life, notwithstanding the fact that the brake linings themselves would have to be replaced after having been in use for much shorter periods of time than would normally be the case if the motor vehicle had not been driven over muddy roads.

It is therefore an object of this invention to provide an improved brake lining structure for use in a brake mechanism of an automotive vehicle, such as a truck or bus, comprising a pair of triangular strips of fibrous woven or molded brake lining material one of which is in the shape of a right triangle and the other of which is preferably in the shape of an obtuse triangle and which are adapted to be secured to each of a pair of sheet metal strips of the same size as the conventional brake shoes. The metal strips are, in turn, secured to the brake shoes, the base portions of the triangular strips of brake lining being disposed in opposite relation to each other when applied to the brake shoes. The edges defining the hypotenuse of the triangular strips of brake lining material are disposed adjacent each other but spaced apart slightly from each other to form a helical groove therebetween when applied to the brake shoes. One of the ends of the pairs of strips of brake lining material coincides with the edges of the brake shoes while the opposite ends of the strips of brake lining material terminate a substantial distance from the other end of the brake shoes thus leaving a portion on each of the sheet metal strips to which a pair of angularly disposed scraper blades may be secured, the thickness of the scraper blades being substantially the same as the thickness of the brake lining material.

When brake shoes having the brake lining material mounted thereon in the manner heretofore described are mounted within the brake drum of the wheel of an automotive vehicle, the helical groove between the triangular strips of brake lining and the angular position of the scraper blades tend to deflect any pieces of earth thrown against the brake drum by the wheel of the motor vehicle and, in the event the wheels of the motor vehicle sink into soft earth, to where the brake drum is partially buried in the soft earth, then, upon the wheels of the motor vehicle moving out of the soft earth, the scraper blades will scrape the earth loose from the braking surfaces of the brake drums and will, in so doing, deflect the pieces of earth outwardly so as to not interfere with the braking action of the brake lining against the drum.

Some of the objects of the invention having been stated, other objects will appear as the description proceeds, when taken in connection with the accompanying drawings in which—

Figure 1 is a vertical sectional view through one of the wheels of a truck, with the invention applied thereto, and showing a portion of the axle therefor in elevation;

Figure 2 is an enlarged vertical sectional view taken substantially along the line 2—2 in Figure 1 and showing the improved brake lining structure as applied to the brake shoes of the same;

Figure 3 is an enlarged vertical sectional view of the brake mechanism mounted on a portion of the axle of a motor vehicle and is taken substantially along the line 3—3 in Figure 2;

Figure 4 is a transverse sectional view through a brake shoe with the improved lining mounted therein and is taken substantially along the line 4—4 in Figure 3;

Figure 5:
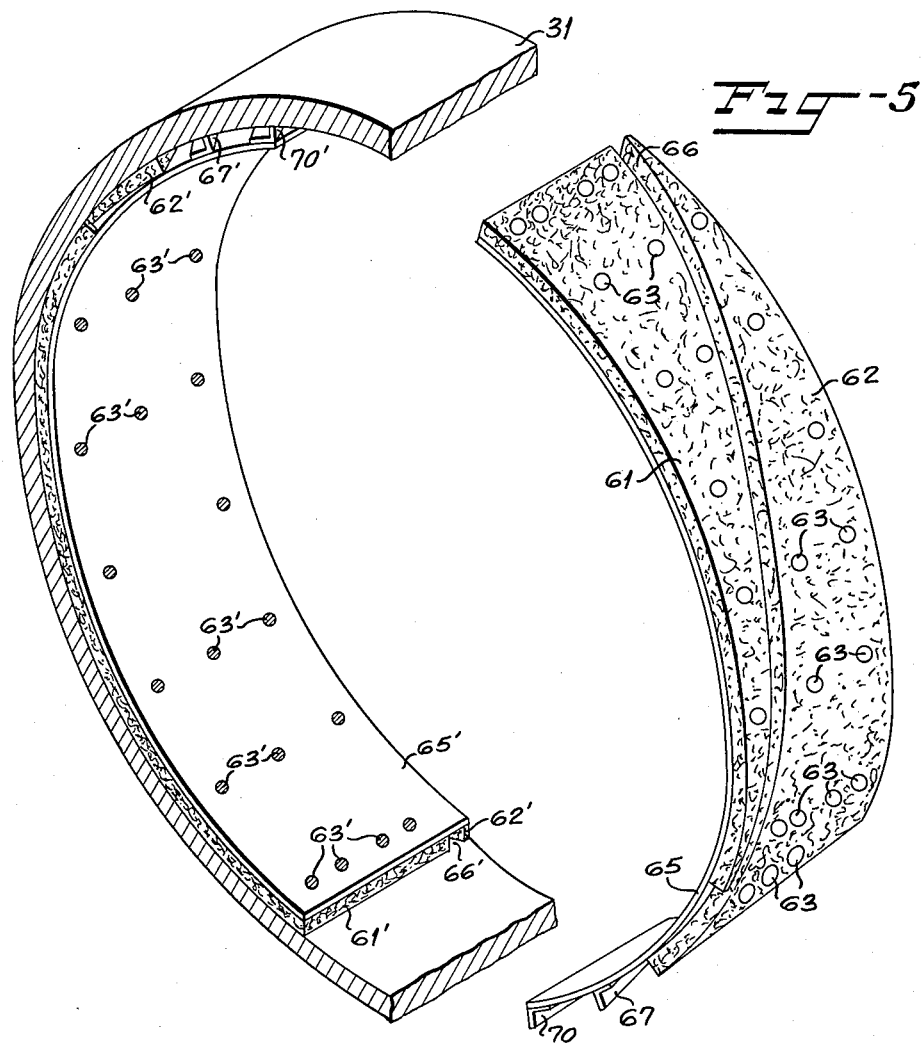
Figure 5 is an isometric view showing a portion of the brake drum in cross section and showing the improved brake lining structure separated from the outer surfaces of the brake shoes.

Referring more specifically to the drawings, the numeral 10 indicates the conventional rear axle housing of a vehicle and may also indicate a trailer or a tractor axle. Although the present invention is shown as being applied to a straight axle housing it is to be understood that the invention may be applied to the front wheels of a motor vehicle if desired. The axle housing 10 has a conventional driven axle 11 mounted for rotation therein which extends outwardly and has an enlarged circular flange 12 on its free end which is secured as by bolts 13 to the outer end of a hub member 14. The hub member 14 is rotatably mounted on the axle housing 10 in a conventional manner similar to that shown in my pending application Serial No. 33, filed January 2, 1948, and entitled Improved Wheel Mounting in Vehicles.

The hub member 14 has an annular flange 20 integral therewith to which an annular brake drum supporting member 21 is secured as by screws 22, only one of which is shown in Figure 3. Conventional dual wheels 23 and 24 bear against the brake drum supporting member 21 and are secured to the annular flange 20 of the hub member 14 by conventional lug bolts 25. The conventional wheels 23 and 24 each have a conventional rim 27 thereon for receiving a pneumatic casing not shown. Although the wheels 23 and 24 are shown in the drawings, it is to be understood that any type of wheels or a single wheel may be mounted on the axle housing 10, the present wheel being shown by way of illustration only.

The brake drum supporting member 21 is secured by suitable screws 30 to a conventional brake drum 31 within the confines of which a conventional brake mechanism is disposed and which will be presently described.

The axle housing in Figures 1 and 3 has a shouldered circular flange 35 integral therewith which is provided with a plurality of holes or bores in which suitable rivets 36 are mounted. These rivets 36 are provided for securing a preformed plate 37 to the flange 35, this preformed plate 37 being provided for supporting the movable parts of the brake mechanism to be later described.

Heretofore, the outer peripheral edge of the preformed plate 37 has been provided with an annular inturned portion which projected over the right-hand outer peripheral edge of the brake drum 31 in Figure 3, its purpose having been to assist in preventing dust particles and the like from entering the area defined by the plate 37, the brake drum 31 and the brake drum supporting member 21. However, due to the fact that wet earth would merely cling to this portion upon the vehicle being driven over muddy roads, it is preferable that the outer peripheral edge of the plate 37 be cut away along its edge as at 40, this outer edge 40 of the plate 37 terminating in a horizontal plane bisecting the thickness of the annular brake drum 31.

Secured to the plate 37, as by a screw 41, is a conventional hydraulic cylinder 42, which is a usual part of brakes of this type and to which hydraulic fluid is directed in a conventional manner, not shown.

Since both sides of the structure are substantially identical, except being opposite hand, the right hand side in Figure 2 will be described and like reference characters with the prime notation added will apply to the other side except for minor variations which will be separately pointed out.

The hydraulic cylinder 42 has a pair of plungers 43 and 43' extending therefrom which engage conventional sockets 44 and 44' of conventional brake shoes 45 and 45', both of which are identical and the upper ends of which are normally urged inwardly toward each other by a conventional tension spring 46 opposed ends of which are connected as at 47 and 47' to the brake shoes 45 and 45' respectively.

Conventional guide members 50 and 50' are riveted to the plate 37 and slidably engage rib portions of the brake shoes 45 and 45' respectively. Secured to the lower ends of the rib portions of the brake shoes 45 and 45' as by rivets 51 and 51', respectively, and pins 52 and 52', respectively, are curved links 53 and 54 and 53' and 54', respectively (Figures 1, 2 and 3). The plate 37 has a raised portion 55 integral therewith which is slidably penetrated by conventional bolts 56 and 56' on which the proximate lower ends of the links 53 and 53' and the links 54 and 54' are pivotally mounted in a conventional manner. This completes the description of the conventional parts of the brake mechanism of an automotive vehicle and it is with these parts that the present invention is adapted to be associated.

The brake shoe 45 has an arcuate outer flange 60 integral therewith to which conventional brake lining material is usually secured. In lieu of the conventional brake lining material being applied to the outer surface of the flange portion 60, I have provided a pair of triangular brake lining members or pieces of brake lining material 61 and 62 (Figures 4 and 5). The piece of brake lining material 61 is in the form of a right triangle and the piece of brake lining material 62 is in the form of an obtuse scalene triangle whose narrowest side is disposed in opposite relation to the narrow side of the piece 61 when they are mounted on the brake shoe 45. These pieces of brake lining material may be secured by any suitable means such as rivets 63, directly to the outer surface of the brake shoe 45 if desired. However, I have found that it is more practical to provide a metal strip 65 between the triangularly shaped strips of brake lining material and the outer surface of the brake shoe 45, in which instance, the rivets 63 would penetrate the metal strip 65 as well as the pieces of brake lining material 61 and 62 securing them to the brake shoe 45. This brake lining material may be woven fabric, pressed fiber or of any tractionable material.

Figure 6:
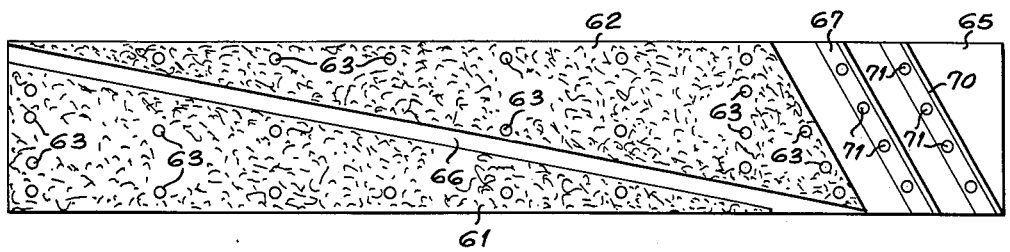
Figure 6 is a developed view of one of the units which are secured to the brake shoes.

It will be noted in Figures 5 and 6 that the base ends of the triangular brake lining members 61 and 62 are disposed in opposite relation to each other and the edges of the triangular members 61 and 62 defining the hypotenuse of the triangles are spaced apart from each other thus forming a helical groove 66 between the triangular brake lining members 61 and 62.

It will also be noted in Figures 2 and 5 that the brake lining members 61' and 62' are flush at their lower ends with the lower edge of the flange 60' of the brake shoe 45' while their upper ends terminate a substantial distance short of the upper end of the brake shoe 45'. Also, the narrow end of the member 62' extends a substantial distance beyond the pointed end of member 61' in the manner that the member 62 is shown relative to the member 61 in Figure 6. However, when the metal strip 65 is employed, this strip 65 extends the entire distance from the lower to the upper end of the brake shoe 45 as shown in Figure 2. This exposed portion of the flange 60 of the brake shoe 45 or the exposed portion of the strip 65, as the case may be, has a pair of spaced scraper blades 67 and 70 in the form of angle bars secured thereto as by rivets, the rivets 71 being shown in Figure 6 as securing the angle bars 67 and 70 to the metal strip 65. These scraper blades 67 and 70 are disposed at a helical angle relative to the shoe 45 and should be of a relatively soft metal, such as aluminum, so they will wear according to the strips of brake lining material 61 and 62 and will not score or scrape particles of metal from the interior surface of the brake drum 31. Any abrasive action between the blades 67 and 70 and the brake drum 31 is well compensated for by the effectiveness of these blades in keeping the brake linings and the drum 31 free of abrasive particles of earth as will be later described.

It will be noted in Figure 5 that only a portion of the brake drum 31 is shown and the brake shoes 45 and 45' have been entirely eliminated from this view, the pieces of brake lining material 61 and 62 and 61' and 62' being shown as secured to the metal strips 65 and 65' only. However, the brake shoes 45 and 45' have been omitted from Figure 5 for purposes of clarity only.

It will be noted in Figure 2 that although the structure of the brake lining associated with the brake shoe 45 is similar to the structure associated with the brake shoe 45', the metal strip 65 extends a substantial distance below the lower end of the brake shoe 45 and the angle bars 67 and 70 are secured to this exposed lower end of the metal strip 65 while the pieces of brake lining material 61 and 62 extend from a point substantially in alinement with the lower edge of the brake shoe 45 and their upper ends terminate flush with the upper end of the brake shoe 45.

It is preferable that the pieces of brake lining material 61 and 62 and 61' and 62' be mounted in the manner shown in Figure 2 relative to the scraper blade angle bars 67 and 70 and 67' and 70', respectively, with respect to the direction of rotation of the brake drum 31 being counterclockwise in Figure 2. It is thus seen that upon the wheel passing through wet earth, clay or the like and the earth being thrown against the brake drum 31, the angle bars 67 and 70 and 67' and 70' will contact the wet earth before it passes to the strips of brake lining material 61 and 62 and 61' and 62', respectively, and will thus tend to throw the particles of earth outwardly toward the open side of the brake drum 31. However, in the event that any of the particles of earth move past the scraper blades 67 and 70 or 67' and 70', the particles of earth will tend to move along the grooves 66 and 66' between the triangular members 61 and 62 and 61' and 62', respectively, and will thus move outwardly through the open ends of this groove.

It is thus seen that I have provided an improved brake lining material for motor vehicles embodying means for breaking up particles of earth which may become lodged against the braking surfaces of the brake drums of a vehicle and for further deflecting these particles of earth away from the braking surfaces of the brake drums and the brake lining.

In the drawings and specification there has been set forth a preferred embodiment of the invention, and although specific terms are employed, they are used in a generic and descriptive sense only, and not for purposes of limitation, the scope of the invention being defined in the claims.

I claim:

1. A brake lining structure adapted to be secured to the curved surfaces of brake shoes comprising a pair of triangularly-shaped pieces of brake lining material whose bases are disposed in opposite relation to each other when secured to each of the brake shoes and whose edges defining the hypotenuse of the triangle are disposed apart from each other when secured to the brake shoes, a metal strip mounted between the pieces of brake lining material and the curved surface of the brake shoe and extending a substantial distance beyond one of the ends of the triangularly-shaped pieces of brake lining material, a pair of scraper blades secured to the exposed portions of the metal strips and being disposed at a helical angle relative to the metal strips when secured to the brake shoe.

2. In a vehicle having an axle housing with a wheel rotatably mounted thereon, said wheel having a brake drum secured thereto and said axle having a peripheral flange integral therewith and a pair of pivoted brake shoes supported by said flange, a brake lining structure adapted to be secured to the outer surfaces of the brake shoes comprising a pair of triangularly-shaped pieces of brake lining material the bases of which are disposed in opposite relation to each other and the edge defining the hypotenuse of each of the triangularly-shaped pieces of brake lining material being spaced apart from each other to thus form a helical groove between the pieces of brake lining material for deflecting foreign matter from the space between the brake lining material and the brake drum, a metal strip mounted between the pieces of brake lining material and the curved surface of the brake shoe and extending a substantial distance beyond one of the ends of the triangularly-shaped pieces of brake lining material, a pair of scraper blades secured to the exposed portions of the metal strips and being disposed at a helical angle relative to the metal strips when secured to the brake shoe.

3. A brake lining structure adapted to be secured to the curved surfaces of brake shoes comprising a pair of triangularly-shaped pieces of brake lining material whose bases are disposed in opposite relation to each other when secured to each of the brake shoes and whose edges defining the hypotenuse of the triangle are disposed apart from each other when secured to the brake shoes, a metal strip mounted between the pieces of brake lining material and the curved surface of the brake shoe and extending a substantial distance beyond one of the ends of the triangularly-shaped pieces of brake lining material, at least one scraper blade secured to the exposed portions of the metal strips and being disposed at a helical angle relative to the metal strips when secured to the brake shoe.

4. In a vehicle having an axle housing with a wheel rotatably mounted thereon, said wheel having a brake drum secured thereto and said axle having a peripheral flange integral therewith and a pair of pivoted brake shoes supported by said flange, a brake lining structure adapted to be secured to the outer surfaces of the brake shoes comprising a pair of triangularly-shaped pieces of brake lining material the bases of which are disposed in opposite relation to each other and the edge defining the hypotenuse of each of the triangularly-shaped pieces of brake lining material being spaced apart from each other to thus form a helical groove between the pieces of brake lining material for deflecting foreign matter from the space between the brake lining material and the brake drum, a metal strip mounted between the pieces of brake lining material and the curved surface of the brake shoe and extending a substantial distance beyond one of the ends of the triangularly-shaped pieces of brake lining material, at least one scraper blade secured to the exposed portions of the metal strips and being disposed at a helical angle relative to the metal strips when secured to the brake shoe.

5. An improved braking means adapted to be used with a brake drum comprising a pair of pivoted brake shoes, a brake lining structure adapted to be secured to the outer surfaces of the brake shoes comprising a pair of triangularly-shaped pieces of brake lining material the bases of which are disposed in opposite relation to each other and the edge defining the hypotenuse of each of the triangularly-shaped pieces of brake lining material being spaced apart from each other to thus form a helical groove between the pieces of brake lining material for deflecting foreign matter from the brake lining material, a metal strip mounted between the pieces of brake lining material and the curved surface of the brake shoe and extending a substantial distance beyond one of the ends of the triangularly-shaped pieces of the brake lining material, a pair of scraper blades secured to the exposed portions of the metal strips and being disposed at a helical angle relative to the metal strips when secured to the brake shoe.

6. An improved braking means adapted to be associated with a brake drum comprising a pair of pivoted brake shoes, a brake lining structure secured to the outer surfaces of the brake shoes comprising a pair of triangularly-shaped pieces of brake lining material, the bases of which are disposed in opposite relation to each other and the edge defining the hypotenuse of each of the triangularly-shaped pieces of brake lining material being spaced apart from each other to thus form a helical groove between the pieces of brake lining material for deflecting foreign matter from the brake lining material, a metal strip mounted between the pieces of brake lining material and the curved surface of the brake shoe and extending a substantial distance beyond one of the ends of the triangularly-shaped pieces of brake lining material, at least one scraper blade secured to the exposed portions of the metal strips and being disposed at a helical angle relative to the metal strips when secured to the brake shoe.

References Cited in the file of this patent

UNITED STATES PATENTS

| | | |
|---|---|---|
| 557,699 | Pirch | Apr. 7, 1896 |
| 1,818,565 | Maynard | Aug. 11, 1931 |
| 1,853,963 | Dick | Apr. 12, 1932 |
| 1,907,490 | Brackett | May 9, 1933 |
| 1,935,713 | Hersinger et al. | Nov. 21, 1933 |
| 1,972,550 | Cunningham | Sept. 4, 1934 |
| 2,144,016 | Gallup | Jan. 17, 1939 |
| 2,150,186 | Pope | Mar. 14, 1939 |
| 2,167,607 | Alden | July 25, 1939 |
| 2,243,569 | Miller | May 27, 1941 |

FOREIGN PATENTS

| | | |
|---|---|---|
| 572,653 | France | June 11, 1924 |

OTHER REFERENCES

"Brake Service," pp. 43. July 1948.